US008745112B2

(12) United States Patent  (10) Patent No.: US 8,745,112 B2
Ozawa  (45) Date of Patent: Jun. 3, 2014

(54) ELECTRONIC CALCULATOR, CALCULATION RESULT DISPLAYING METHOD, AND RECORDING MEDIUM STORING PROGRAM FOR DISPLAYING CALCULATION RESULT

(75) Inventor: Makoto Ozawa, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 435 days.

(21) Appl. No.: 13/270,430

(22) Filed: Oct. 11, 2011

(65) Prior Publication Data

US 2012/0096060 A1  Apr. 19, 2012

(30) Foreign Application Priority Data

Oct. 13, 2010  (JP) .................................. 2010-230183

(51) Int. Cl.
 *G06F 5/00*  (2006.01)
(52) U.S. Cl.
 USPC ........................................................ 708/206
(58) Field of Classification Search
 None
 See application file for complete search history.

(56) References Cited

U.S. PATENT DOCUMENTS

| 3,987,290 | A | * | 10/1976 | Dickinson ..................... 708/170 |
| 4,511,987 | A | * | 4/1985 | Caldwell et al. .............. 708/142 |
| 6,944,638 | B1 | * | 9/2005 | Putnam ........................ 708/206 |
| 2003/0101204 | A1 | * | 5/2003 | Watson ........................ 708/206 |
| 2004/0068529 | A1 | * | 4/2004 | Pai ................................ 708/206 |
| 2012/0096060 | A1 | * | 4/2012 | Ozawa ......................... 708/168 |
| 2013/0305133 | A1 | * | 11/2013 | Freedman et al. ............ 715/209 |

FOREIGN PATENT DOCUMENTS

JP  07-230428 A  8/1995
JP  2008-140148 A  6/2008

* cited by examiner

*Primary Examiner* — David H Malzahn
(74) *Attorney, Agent, or Firm* — Holtz Holtz Goodman & Chick PC

(57) ABSTRACT

A mathematical formula input unit inputs a mathematical formula according to a user manipulation. A calculation unit calculates a calculation result of the mathematical formula. A display unit displays the mathematical formula and the calculation result. A position specifying unit specifies a position in a display area on the display unit according to a user manipulation. A right slide ENG display control unit performs ENG normal conversion to the calculation result and updates display contents thereof when a position of the calculation result is specified by the position specifying unit and a slide manipulation is performed toward the right. A left slide ENG display control unit performs ENG inverse conversion to the calculation result and updates display contents thereof when a position of the calculation result is specified by the position specifying unit and a slide manipulation is performed toward the left.

6 Claims, 8 Drawing Sheets

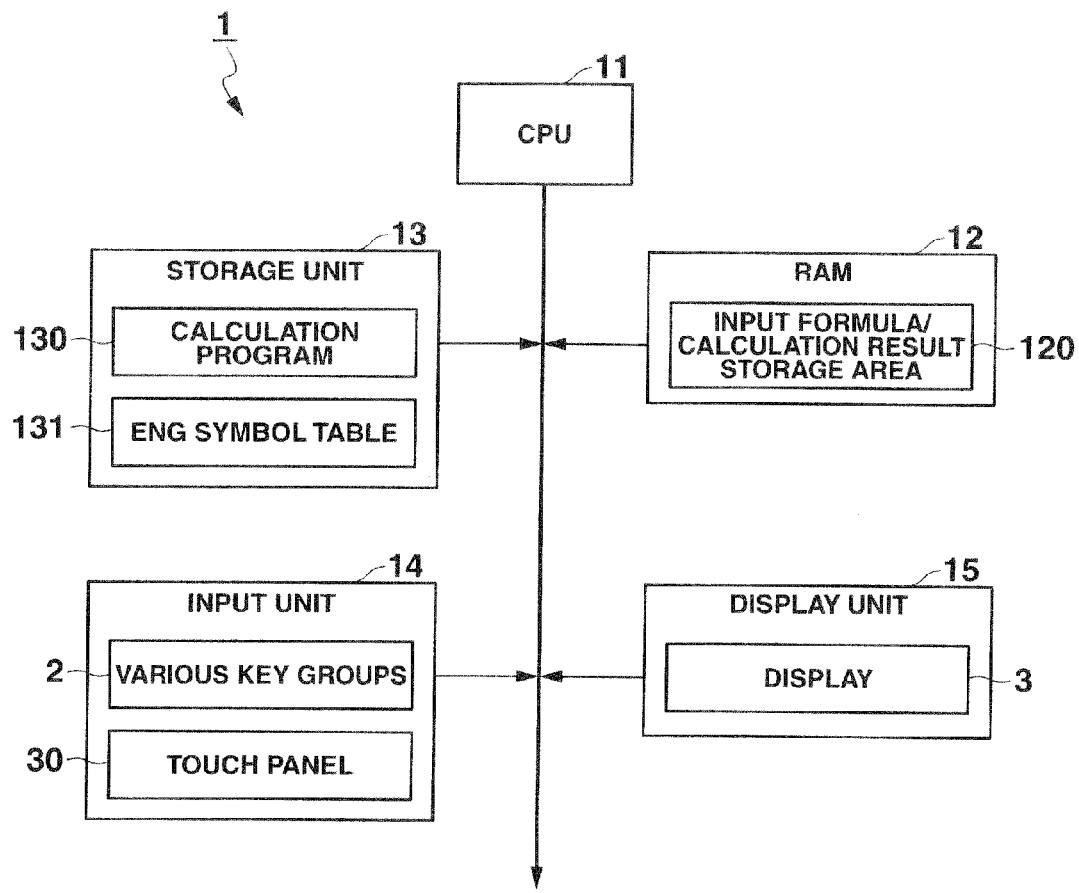

ELECTRONIC CALCULATOR, CALCULATION RESULT DISPLAYING METHOD, AND RECORDING MEDIUM STORING PROGRAM FOR DISPLAYING CALCULATION RESULT

CROSS-REFERENCE TO RELATED APPLICATIONS

This application is based upon and claims the benefit of priority from Japanese Patent Application No. 2010-230183, filed Oct. 13, 2010, the entire contents of which are incorporated herein by reference.

BACKGROUND OF THE INVENTION

1. Field of the Invention

The present invention relates to an electronic calculator, a calculation result displaying method, and a recording medium storing a program, capable of displaying a calculation result by ENG notation.

2. Description of the Related Art

Conventionally, in an electronic calculator having a calculation function, a numerical value is displayed in an engineering unit display mode in which SI prefixes such as k (or E+03), M (or E+06), m (or E−03), and μ (or E−06) are used. What is called an ENG conversion (engineering conversion) that changes a calculation result for engineering unit display suitable for a user is widely incorporated in the electronic calculators.

Specifically, in the ENG conversion function, after the calculation result is expressed by exponent notation, an exponent portion can be displayed while increased (ENG normal conversion) or decreased (ENG inverse conversion) every three digits according to a user manipulation. For example, the calculation result of "1.2" can be displayed while changed into "0.0012E+03" or "1200E−03".

However, in the conventional ENS conversion function, although the calculation result can be changed, it is necessary to manipulate plural keys such as an "option" key and a "function" key in order to perform the ENG conversion function, and it is a troublesome task.

BRIEF SUMMARY OF THE INVENTION

Accordingly, it is an object of the invention to provide an electronic calculator capable of performing the ENG conversion easier than before.

According to one aspect of the invention, there is provided an electronic calculator comprising: a mathematical formula input, unit configured to input a mathematical formula according to a user manipulation; a calculation unit configured to calculate calculation result of the mathematical formula; display unit configured to display the mathematical formula and the calculation result; a position specifying unit configured to specify a position in a display area on the display unit according to a user manipulation; a right slide ENG display control unit configured to perform ENG normal conversion to the calculation result and update display contents thereof when a position of the calculation result is specified by the specifying unit and a slide manipulation is performed toward the right; and a left slide ENG display control unit configured to perform ENG inverse conversion to the calculation result and update display contents thereof when a position of the calculation result is specified by the position specifying unit and a slide manipulation is performed toward the left.

According to the electronic calculator of the invention, the ENG normal conversion is performed to the calculation result and the display contents thereof are updated when a position of the calculation result is specified and the slide manipulation is performed from the left toward the right in the display area according to the user manipulation, whereas the ENG inverse conversion is performed to the calculation result and the display contents thereof are updated when a position of the calculation result is specified and the slide manipulation is performed from the right toward the left in the display area according to the user manipulation. Therefore, the ENG conversion can GO easily be performed compared with the conventional case where plural keys such as the "option" key and the "function" key need to be manipulated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating a functional configuration of the scientific electronic calculator;

FIG. 3 is a view illustrating a data structure of an ENG symbol table;

DETAILED DESCRIPTION OF THE INVENTION

Hereinafter embodiments of the invention will be described in detail with reference to the drawings. However, the scope of the invention is not limited to the illustrated examples.

1.1 Appearance Configuration

Figure 1:
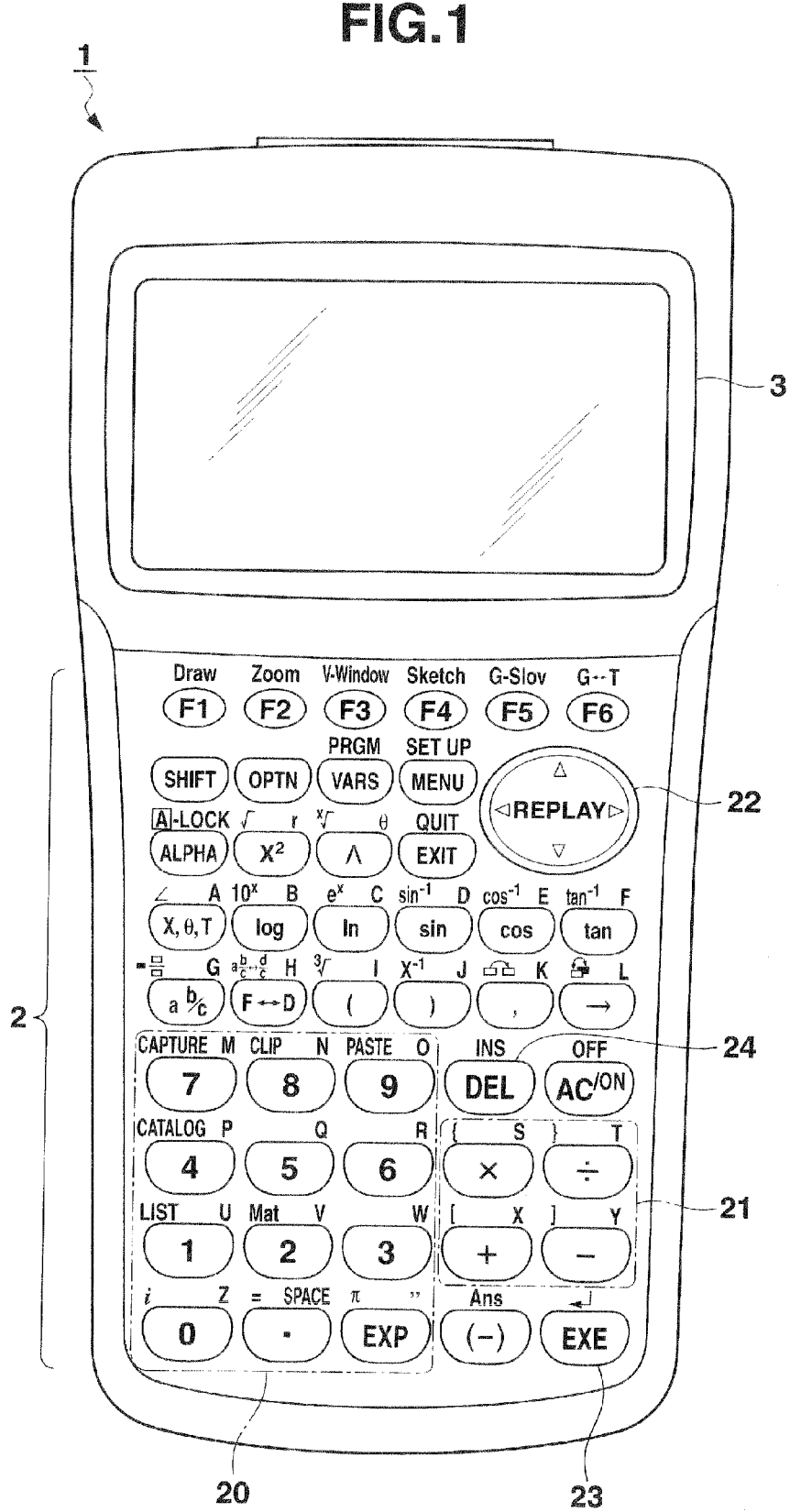
FIG. 1 is a plan view illustrating a schematic configuration of a scientific electronic calculator.

FIG. 1 is a plan view illustrating a schematic configuration of a scientific electronic calculator 1 to which an electronic apparatus according to the embodiment is applied.

As illustrated in FIG. 1, the scientific electronic calculator 1 includes an input key group 2 including various key groups and a display 3.

The input key group 2 receives input manipulations of formula configuration elements such as a numerical value and a symbol of operation or instruction manipulations of various pieces of processing. The input key group 2 includes plural keys to which unique functions are allocated, respectively. In the embodiment, the input key group 2 includes a numerical keypad 20, a symbol-of-operation key 21, cursor key 22, an EXE key 23, and DEL key 24.

The numerical keypad 20 receives the input manipulation of the numerical value, and the symbol-of-operation key 21 receives input, manipulations of operator symbols of four arithmetic operations, a bracket, a root sign ($\sqrt{\ }$), a logarithmic sign, a trigonometric function sign, a vinculum of a fraction, and a constant (such as a circumference ratio "$\pi$").

The cursor key 22 is pressed when a cursor indicating an editing target position or a selecting target position is moved in a predetermined direction in the display 3. In the embodiment, the cursor key 22 is configured such that four directions of left, right, top, and bottom can be input.

The EXE key 23 receives input manipulations of an instruction to perform processing and an instruction to determine processing. For example, the EXE key 23 acts as a key providing an instruction to perform calculation processing after the mathematical formula is input. The DEL key 2 receives a deletion manipulation of the numerical value or the symbol of operation displayed on the display 3.

The display 3 includes a liquid crystal display (LCD) or an electronic luminescent display (ELD) to display various pieces of data necessary to use the scientific electronic calculator 1 in addition to characters, signs, the mathematical formula, and the calculation result. In the display 3 of the embodiment, a touch panel 30 is integrally provided over a whole surface of a display screen.

1.2 Functional Configuration

A functional configuration of the scientific electronic calculator 1 will be described below.

FIG. 2 is a block diagram schematically illustrating the functional configuration of the scientific electronic calculator 1.

As illustrated in FIG. 2, the scientific electronic calculator 1 includes an input unit 14, a display unit 15, a random access memory (RAM) 12, a storage unit 13, and a central processing unit (CPU) 11.

The input unit 14 includes the input key group 2 and the touch panel 30, and outputs a manipulation signal corresponding to the position of the pressed key or the touch panel 30 to the CPU 11.

The display unit 15 includes the display 3 and displays various pieces of information on the display 3 according to a display signal from the CPU 11.

The RAM 12 is a volatile memory that temporarily stores information, and the RAM 12 includes plural work areas for storing various programs to be executed and pieces of data relating to the various programs. For example, the RAM 12 of the embodiment includes an input formula/calculation result storage area 120 as the work area.

A mathematical formula input in calculation processing (see FIG. 4) and at least one calculation result of the mathematical formula are stored in the input formula/calculation result storage area 120 while correlated with each other.

The storage unit 13 is a nonvolatile memory including a read only memory (ROM), which stores various programs and various pieces of data. Specifically, the storage unit 13 stores a calculation program 130 according to the invention and an ENG symbol table 131.

The calculation program 130 causes the CPU 11 to perform the calculation processing to be described later (see FIG. 4).

As illustrated in FIG. 3, what is called the ENG symbol and a numerical quantity meant by the ENG symbol are stored in the ENG symbol table 131 while correlated with each other. As used herein, the ENG symbol means a prefix indicating a number. In the embodiment, the ENG symbol is a prefix (SI prefix) indicating a number of powers of 10. Alternatively, another kind of a prefix such as a binary prefix may be used.

The CPU 11 controls each unit of the scientific electronic calculator 1. Specifically, the CPU 11 loads the program specified from a system program and various application programs, which are stored in the storage unit 13, into the RAM 12 and performs various pieces of processing in cooperation with the program loaded into the RAM 12.

1.3 Operation of Scientific Electronic Calculator

An operation of the scientific electronic calculator 1 will be described below.

Figure 4:
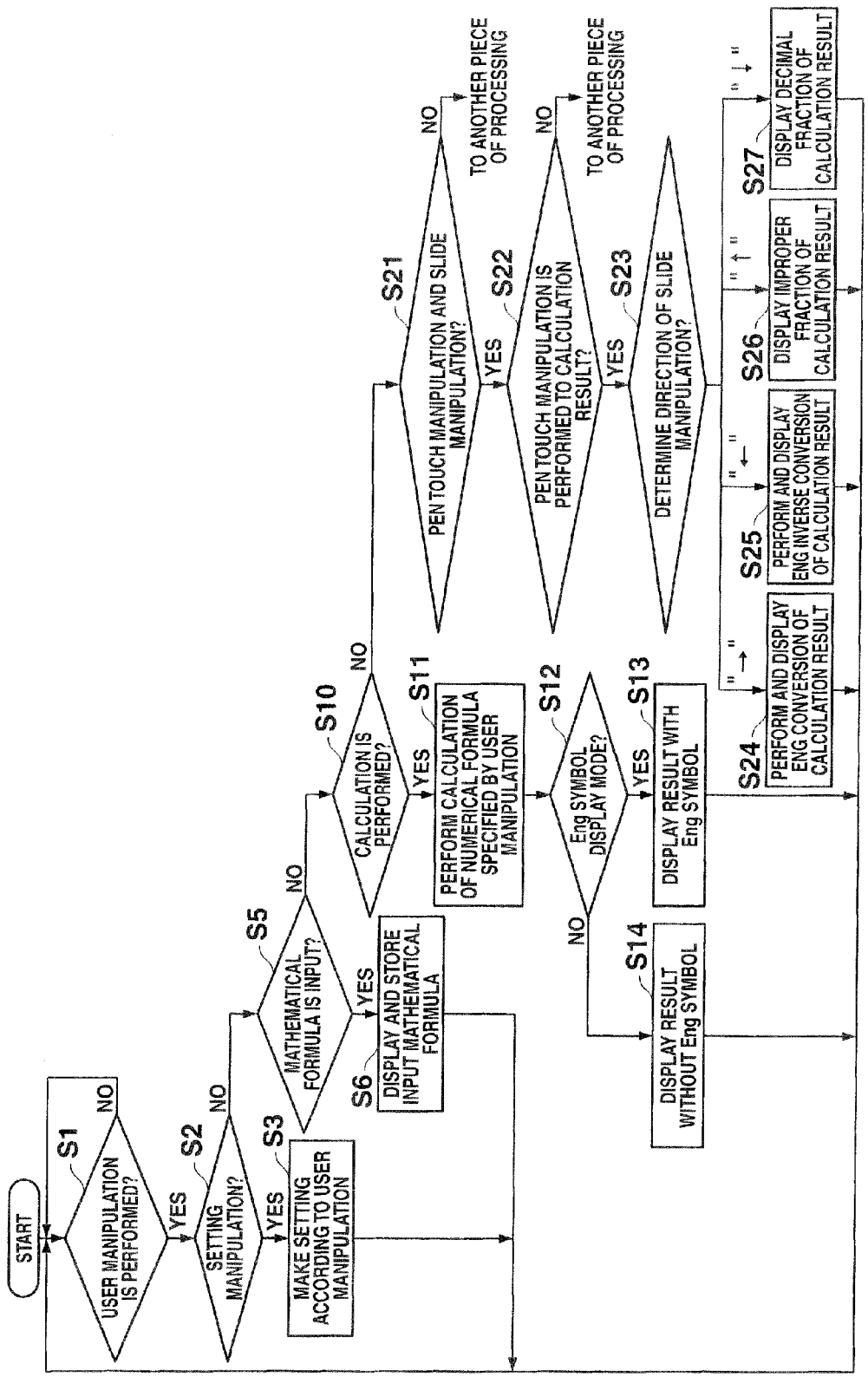
FIG. 4 is a flowchart illustrating a flow of calculation processing.

FIG. 4 is a flowchart illustrating an operation of the calculation processing. When a user inputs the instruction to perform the calculation processing through the input unit 14, the calculation program 130 is read from the storage unit 13 and appropriately loaded into the RAM 12, whereby the calculation processing is performed by the cooperation between the calculation program 130 and the CPU 11.

As illustrated in FIG. 4, in the calculation processing, the CPU 11 determines whether or not a user manipulation is performed (Step S1). When the user manipulation is not performed (NO in Step S1), the processing in Step S1 is repeatedly performed.

When the user manipulation is performed (YES in Step S1), the CPU 11 determines whether or not a setting manipulation is performed to a display mode of the display 3 (Step S2). When the setting manipulation is performed (YES in Step S2), the setting is made according to the user manipulation (Step S3), and the flow returns to Step S1. In the embodiment, the user can switch a setting as to whether or not the display setting of the display 3 is to be made to an ENG symbol display mode in Step S3. As used herein, the ENG symbol display mode means a mode in which the ENG symbol is used in the notation of the exponent portion while the calculation result is displayed by the exponent notation.

When the setting manipulation is not performed (NO in Step S2), the CPU 11 determines whether or not the mathematical formula is input (Step S5). When the mathematical formula is input (YES in Step S5), the input mathematical formula is stored in the input formula/calculation result storage area 120 while displayed on the display 3 (Step S6), and the flow returns to Step S1.

When the mathematical formula is not input (NO in Step S5), the CPU 11 determines whether or not a calculation manipulation is performed (Step S10).

When the calculation manipulation is performed (YES in Step S10), the CPU 11 performs the calculation specified by the user manipulation (Step S11), and the CPU 11 determines whether or not the display setting of the display 3 is currently made to the ENG symbol display mode (Step S12).

When the display setting is currently made to the ENG symbol display mode (YES in Step S12), the CPU 11 converts the exponent portion included in the calculation result into the notation in which the ENG symbol is used, the CPU 11 displays the converted calculation result on the display 3, and stores the converted calculation result in the input formula/calculation result storage area 120 while correlating the converted calculation result with the input mathematical formula (Step S13). Then the flow returns to Step S1. In Step S13, in the case where the calculation result is not expressed by the exponent notation, the CPU 11 converts the calculation result such that the calculation result is expressed using the ENG symbol corresponding to the numerical value. For example, 12345 is converted into 12.345 k, and 0.12345 is converted into 123.45 m.

When the display setting is not made to the ENG symbol display mode (NO in Step S12), the CPU 11 displays the calculation result on the display 3, and stores the calculation result in the input formula/calculation result storage area 120 while correlating the calculation result with the input mathematical formula (Step S14). Then the flow returns to Step S1.

When the calculation manipulation is not performed (NO in Step S10), the CPU 11 determines whether or not a pen touch manipulation and a slide manipulation are performed (Step S21). When the pen touch manipulation and the slide manipulation are not performed (NO in Step S21), the flow goes to another piece of processing.

When the pen touch manipulation and the slide manipulation are performed (YES in Step S21), the CPU 11 determines whether or not the pen touch manipulation is performed at a position of one of the calculation results displayed on the display 3 (Step S22). When the pen touch manipulation is not performed at the position of one of the calculation results (NO in STEP S22), the flow goes to another piece of processing.

When the pen touch manipulation is performed at the position of one of the calculation results (YES in Step S22), the CPU 11 determines a direction of the slide manipulation (Step S23). As used herein, the direction of the slide manipulation means a direction from a starting point to an ending point of the slide manipulation. For example, the direction of the slide manipulation is the "left" in the case where the slide manipulation is oriented from the right toward the left, and the direction of the slide manipulation is the "right" in the case where the slide manipulation is oriented from the left toward the right.

When the direction of the slide manipulation is the "right" ("→" in Step S23), the CPU 11 performs the ENG normal conversion to the calculation result and updates the display contents thereof on the display 3 (Step S24), and the flow returns to Step S1. As used herein, the ENG normal conversion means that the mantissa portion of the calculation result expressed by the exponent notation is increased by triple digits while the exponent portion is decreased by triple digits. For example, the calculation result of "1.2" is converted into "1200E–03".

When the direction of the slide manipulation is the "left" ("←" in Step S23), the CPU 11 performs the INC inverse conversion to the calculation result and updates the display contents thereof on the display 3 (Step S25), and the flow returns to Step S1. As used herein, the ENG inverse conversion means that the mantissa portion of the calculation result expressed by the exponent notation is decreased by triple digits while the exponent portion is increased by triple digits. For example, the calculation result of "12.3" is converted into "0.0123E+02".

In the embodiment, in Steps S24 and S25, the CPU 11 displays the exponent portion as "+00" in the case where the exponent portion of the calculation result becomes 0 as a result of the ENG normal conversion and the INC inverse conversion. However, in the ENG symbol display mode, the symbol is not displayed in the case where the exponent portion is "+00".

When the direction of the slide manipulation is the "top" ("↑" in Step S23), the CPU 11 converts the calculation result into the fraction and updates the display contents thereof on the display 3 (Step S26), and the flow returns to Step S1. In the embodiment, the fraction includes the improper fraction. The fraction may be displayed on the display 3 in what is called a natural display form (display form in general textbooks and books) or in a one-line display form.

When the direction of the slide manipulation is the "bottom" ("↓" in Step S23), the CPU 11 converts the calculation result into the decimal fraction and updates the display contents thereof on the display 3 (Step S27), and the flow returns to Step S1.

1.4 Operation Examples

The operation of the scientific electronic calculator 1 will specifically be described below with reference to the drawings.

Operation Example 1

As illustrated in FIGS. 5A, 5B, 5C, and 5D, the user performs the setting manipulation in which the calculation result is expressed in not the ENG symbol display mode but a normal mode with respect to the display mode of the display 3 (Step S3).

Figure 5A:
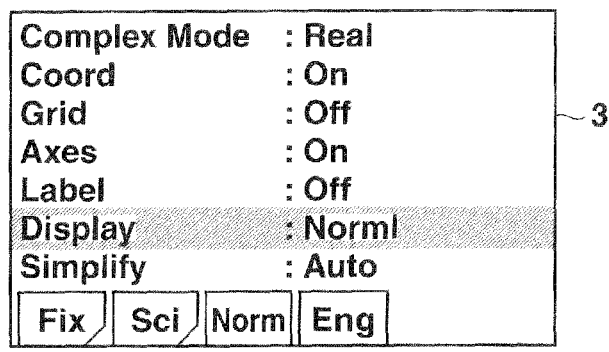
FIGS. 5A, 5B, 5C, and 5D is a view illustrating display contents of a display.
Figure 5B:
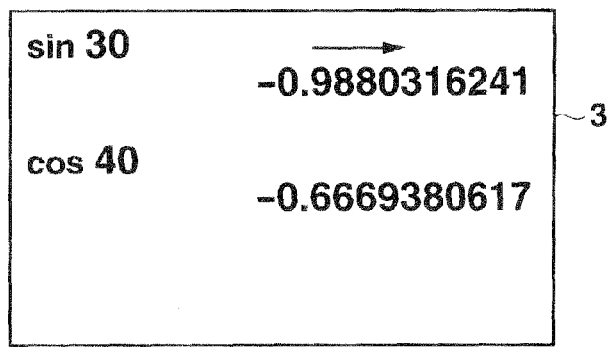

When the user inputs a mathematical formula "sin 30" (YES in Step S5), the input mathematical formula "sin 30" is displayed on the display 3 as illustrated in FIG. 5B (Step S6).

When the user performs the calculation manipulation (YES in Step S10), the calculation is performed to the input mathematical formula "sin 30" (Step S11), the determination that the display setting of the display 3 is not currently made to the ENG symbol display mode is made (NO in Step S12), and the calculation result "–0.988 . . . " is displayed (Step S14).

Similarly, when the user inputs a mathematical formula "cos 40" (YES in Step S5), the input mathematical formula "cos 40" is displayed on the display 3 (Step S6). When the user performs the calculation manipulation (YES in Step S10), the calculation is performed to the input mathematical formula "cos 40" (Step S11), the determination that the display setting of the display 3 is riot currently made to the ENG symbol display mode is made (NO in Step S12), and the calculation result "–0.666 . . . " is displayed (Step S14).

Figure 5C:
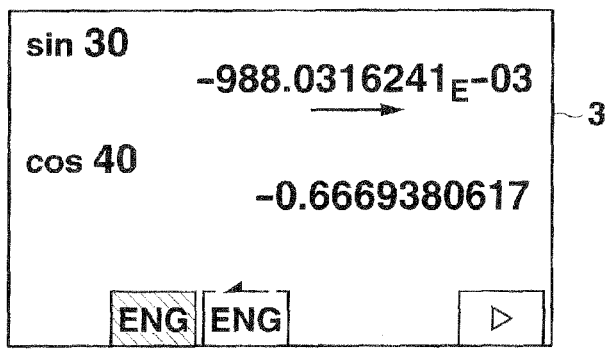

When the user performs the pen touch manipulation at the position of the calculation result "–0.988 . . . " (YES in Step S22) and performs the slide manipulation toward the "right" ("→" in Step S23), the ENG normal conversion is performed to the calculation result and the calculation result "–988 . . . E–03" is displayed as illustrated in FIG. 5C (Step S24). In the present operation example 1 and the operation example 2 as described later, in the case where the ENG conversion or the ENG inverse conversion is performed, that the ENG conversion or the ENG inverse conversion is performed is displayed in a lower portion of the display 3. More specifically, a mark of "ENG" displayed in the lower portion of the display 3 is highlighted in the case where the ENG conversion is performed, whereas marks of "ENG" and "←" displayed in the lower portion of the display 3 are highlighted in the case where the ENG inverse conversion is performed.

Figure 5D:
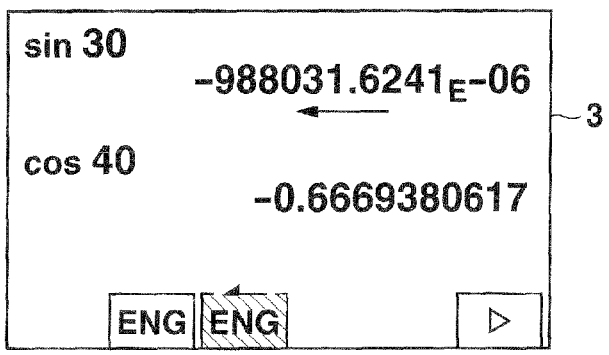

When the user performs the pen touch manipulation at the position of the calculation result "–988 . . . E–03" (YES in Step S22) and performs the slide manipulation toward the "right" ("→" in Step S23), the ENG normal conversion is performed to the calculation result and the calculation result "–988031 . . . E–06" is displayed as illustrated in FIG. 5D (Step S24).

Figure 6A:
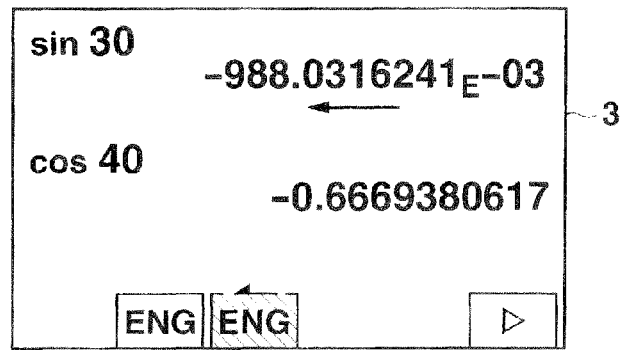
FIGS. 6A, 6B, 6C, and 6D are views illustrating display contents of the display.

When the user performs the pen touch manipulation at the position of the calculation result "–988031 . . . E–06" (YES in Step S22) and performs the slide manipulation toward the "left" ("←" in Step S25), the ENG inverse conversion is performed to the calculation result and the calculation result "−988 . . . E−03" is displayed as illustrated in FIG. 6A (Step S25).

Figure 6B:
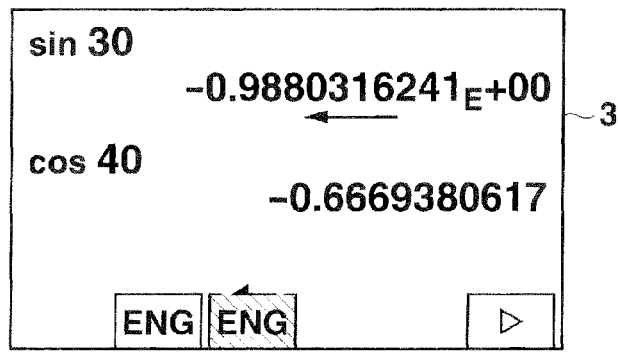

When the user performs the pen touch manipulation at the position of the calculation result "−988 . . . E−03" (YES in Step S22) and performs the slide manipulation toward the "left" ("←" in Step S23), the calculation result "−0.988 . . . " is converted into the exponent notation to display the converted calculation result "−0.988 . . . E+00" as illustrated in FIG. 6B (Step S25).

Figure 6C:
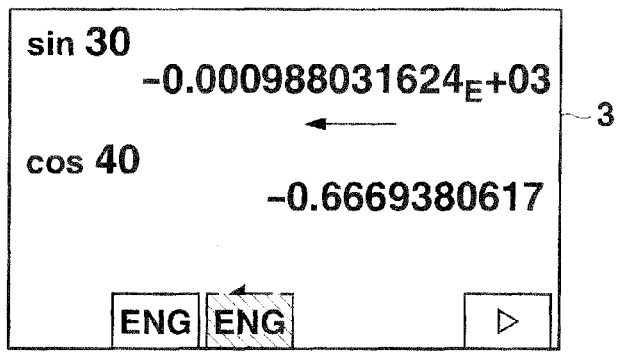

When the user performs the pen touch manipulation at the position of the calculation result "−0.988 . . . E+00" (YES in Step S22) and performs the slide manipulation toward the "left" ("←" in Step S23), the ENG inverse conversion is performed to the calculation result and the calculation result "−0.000988 . . . E+03" is displayed as illustrated in FIG. 6C (Step S25).

Figure 6D:
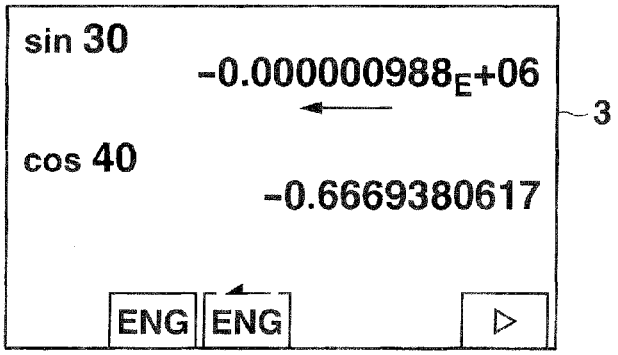

When the user performs the pen touch manipulation at the position of the calculation result "−0.000988 . . . E+03" (YES in Step S22) and performs the slide manipulation toward the "left" ("←" in Step S23), the ENG inverse conversion is performed to the calculation result and the calculation result "−0.000000988 . . . E+06" is displayed as illustrated in FIG. 6D (Step S25).

Operation Example 2

Figure 7A:
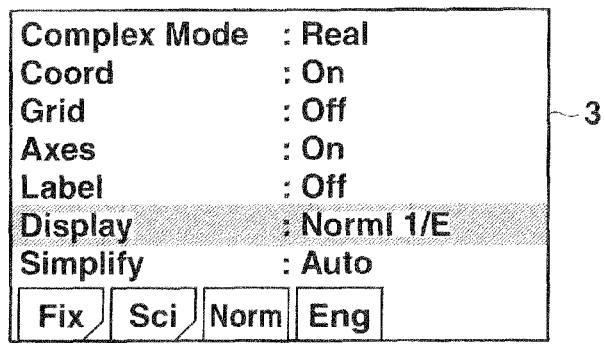
FIGS. 7A, 7B, 7C, and 7D are views illustrating display contents of the display.

As illustrated in FIG. 7A, the user performs the setting manipulation in which the calculation result is expressed in the ENG symbol display mode with respect to the display mode of the display 3 (Step S3).

Figure 7B:
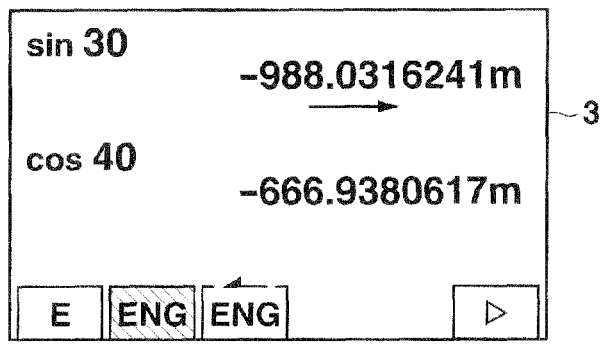

When the user inputs the mathematical formula "sin 30" (YES in Step S5), the input mathematical formula "sin 30" is displayed on the display 3 as illustrated in FIG. 7B (Step S6).

When the user performs the calculation 2.5 manipulation (YES in Step S10), the calculation is performed to the input mathematical formula "sin 30" (Step S11), the determination that the display setting of the display 3 is currently made to the ENS symbol display mode is made (YES in Step S12), the determination that the calculation result "−0.988 . . . " is not displayed by the exponent notation is made, the calculation result is converted into "−988 . . . m" such that the exponent portion is displayed using the optimum ENG symbol "m" (milli), and the converted calculation result "−988 . . . m" is displayed on the display 3 (Step S13).

Similarly, when the user inputs the mathematical formula "cos 40" (YES in Step S5), the input mathematical formula "cos 40" is displayed on the display 3 (Step S6). When the user performs the calculation manipulation (YES in Step S10), the calculation is performed to the input mathematical formula "cos 40" (Step S11), the determination that the display setting of the display 3 is currently made to the ENG symbol display mode is made (YES in Step S12), the determination that the calculation result "−0.666 . . . " is not displayed by the exponent notation is made, the calculation result is converted into "−666 . . . m" such that the exponent portion is displayed using the optimum ENG symbol "m" (milli), and the converted calculation result "−666 . . . m" is displayed on the display 3 (Step S13).

Figure 7C:
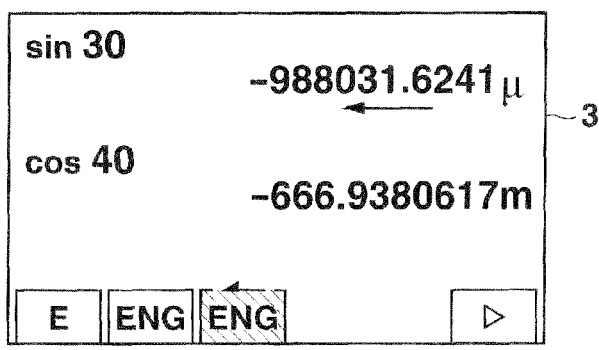

When the user performs the pen touch manipulation at the position of the calculation result "−988 . . . m" (YES in Step S22) and performs the slide manipulation toward the "right" ("→" in Step S23), the ENG normal conversion is performed to the calculation result and the calculation result "−988031 . . . μ" is displayed as illustrated in FIG. 7C (Step S24).

Figure 7D:
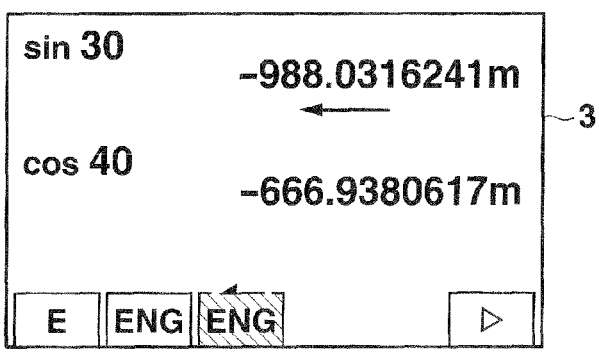

When the user performs the pen touch manipulation at the position of the calculation result "−988031 . . . μ" (YES in Step S22) and performs the slide manipulation toward the "left" ("←" in Step S23), the ENG inverse conversion is performed to the calculation result and the calculation result "−988 . . . m" is displayed as illustrated in FIG. 7D (Step S25).

Figure 8A:
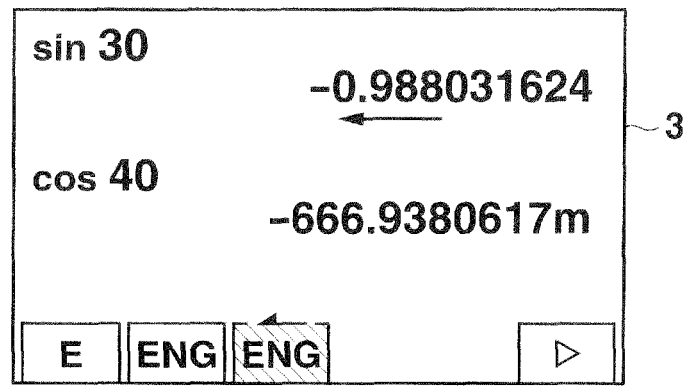
FIGS. 8A, 8B, and 8C are views illustrating display contents of the display.

When the user performs the pen touch manipulation at the position of the calculation result "−988 . . . m" (YES in Step S22) and performs the slide manipulation toward the "left" ("←" in Step S23), the ENG inverse conversion is performed to the calculation result, the converted calculation result "−0.988 . . . m" is calculated, and the calculation result "−0.988 . . . m" is displayed irrespective of the exponent notation as illustrated in FIG. 8A (Step S25).

Figure 8B:
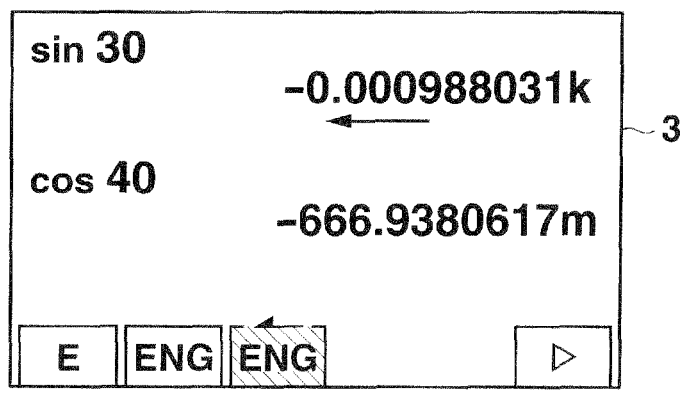

When the user performs the pen touch manipulation at the position of the calculation result "−0.988 . . . m" (YES in Step S22) and performs the slide manipulation toward the "left" ("←" in Step S23), the ENG inverse conversion is performed to the calculation result and the calculation result "−0.000988 . . . k" is displayed as illustrated in FIG. 8B (Step S25).

Figure 8C:
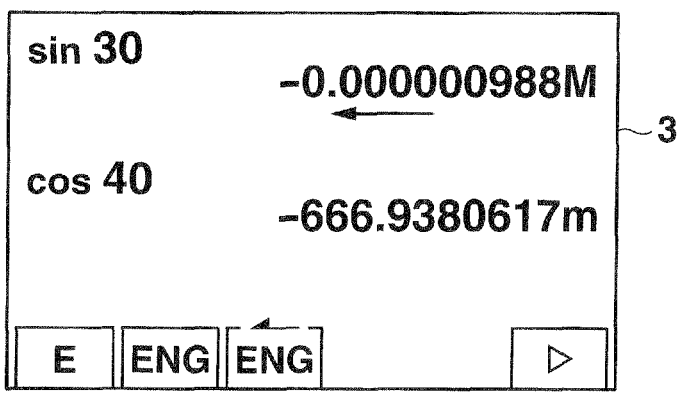

When the user performs the pen touch manipulation at the position of the calculation result "−0.000988 . . . k" (YES in Step S22) and performs the slide manipulation toward the "left" ("←" in Step S23), the ENG inverse conversion is performed to the calculation result and the calculation result "−0.000000988 . . . M" is displayed as illustrated in FIG. 8C (Step S25).

Operation Example 3

Figure 9A:
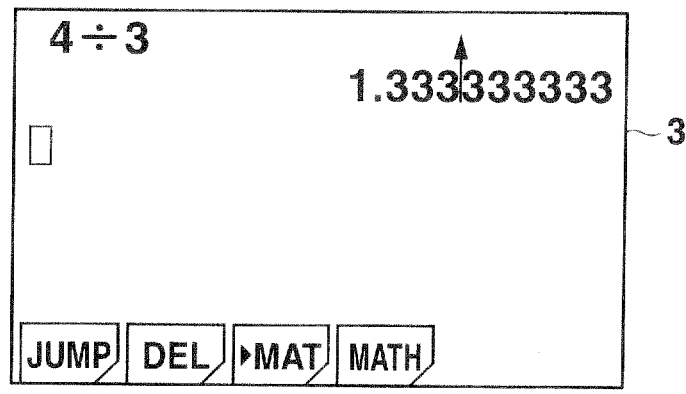
FIGS. 9A, 9B, and 9C are views illustrating display contents of the display.

As illustrated in FIG. 9A, when the user inputs a mathematical formula "4+3" from a state in which the display setting of the display 3 is not made to the ENG symbol display mode (YES in Step S5), the input mathematical formula "4+3" is displayed on the display 3 (Step S6).

When the user performs the calculation manipulation (YES in Step S10), the calculation is performed to the input mathematical formula "4+3" (Step S11), the determination that the display setting of the display 3 is not currently made to the ENG symbol display mode is made (NO in Step S12), and the calculation result "1.333 . . . " is displayed (Step S14).

Figure 9B:
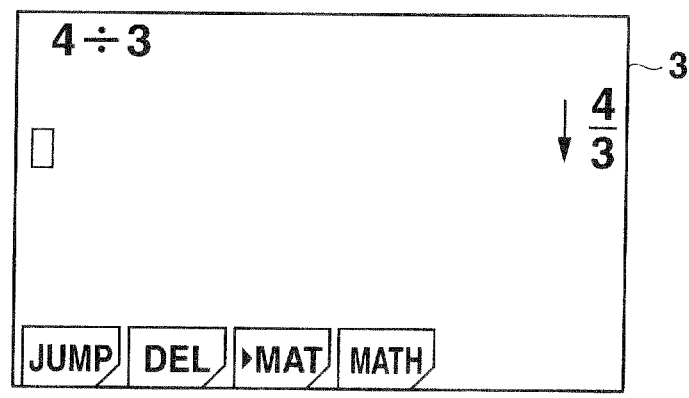

When the user performs the pen touch manipulation at the position of the calculation result "1.333 . . . " (YES in Step S22) and performs the slide manipulation toward the "top" ("↑" in Step S23), the calculation result is converted into the fraction and the calculation result "4/3" is displayed as illustrated in FIG. 9B (Step S26).

Figure 9C:
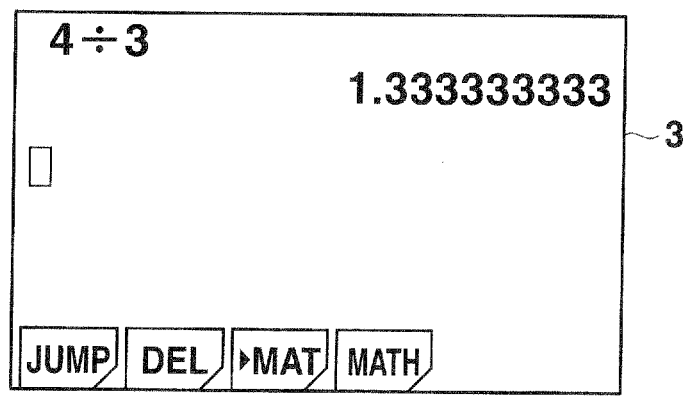

When the user performs the pen touch manipulation at the position of the calculation result "4/3" (YES in Step S22) and performs the slide manipulation toward the "bottom" ("↓" in Step S23), the calculation result is converted into the decimal fraction and the calculation result "1.333 . . . " is displayed as illustrated in FIG. 9C (Step S27).

According to the embodiment, as illustrated in Steps S24 and S25 of FIG. 4, FIGS. 5A, 5B, 5C, and 5D, FIGS. 6A, 6B, 6C, and 6D, FIGS. 7A, 7B, 7C, and 7D, and FIGS. 8A, 8B, and BC, the ENG normal conversion is performed to the calculation result and the display contents thereof are updated when a position of the calculation result is specified and the slide manipulation is performed from the left toward the right in the display area according to the user manipulation, whereas the ENG inverse conversion is performed to the calculation result and the display contents thereof are updated when a position of the calculation result is specified and the slide manipulation is performed from the right toward the left in the display area according to the user manipulation. Therefore, the ENG conversion can easily be performed compared with the conventional case where plural keys such as the "option" key and the "function" key need to be manipulated.

As illustrated in Steps S13 of FIG. 4, FIGS. 7A, 7B, 7C, and 7D, and FIGS. 8A, 8B, and 8C, the calculation result is displayed using the ENG symbol in the exponent portion when the setting is made to display the calculation result using the ENG symbol. Therefore, the ENG conversion can easily be performed while the exponent portion is displayed using the ENG symbol.

As illustrated in Step S21 of FIG. 4, FIGS. 5A, 5B, 5C, and 5D, FIGS. 6A, 6B, 6C, and 6D, FIGS. 7A, 7B, 7C, and 7D, and FIGS. 8A, 8B, and 8C, plural mathematical formulas and plural calculation results can be displayed while correlated with each other, and any calculation result can be specified in the displayed plural mathematical formulas. Therefore, the ENG conversion can be performed to the previously-calculated calculation result unlike the case where the ENG conversion can be performed only by specifying the latest calculation result.

As illustrated in Steps S26 and S27 of FIG. 4, and FIGS. 9A, 9B, and 9C, the calculation result is converted into the fraction and the display contents thereof are updated when a position of the calculation result is specified and the slide manipulation is performed from the bottom toward the top in the display area according to the user manipulation, whereas the calculation result is converted into the decimal fraction and the display contents thereof are updated when a position of the calculation result is specified and the slide manipulation is performed from the top toward the bottom in the display area according to the user manipulation. Therefore, the conversion can easily be performed between the fraction and the decimal fraction.

The detailed configuration and detailed operation of each component in the scientific electronic calculator 1 of the embodiment can properly be changed without departing from the scope of the invention.

Although the electronic calculator of the invention is described as the scientific electronic calculator 1, the invention is not limited to the scientific electronic calculator. For example, the invention can generally be applied to an electronic apparatus such as a mobile phone, a personal computer, a personal digital assistant (CPA), and a game machine. The calculation program 130 of the invention may be stored in a memory card, a CD, and the like that can detachably be attached to the scientific electronic calculator 1.

Additional advantages and modifications will readily occur to those skilled in the art. Therefore, the invention in its broader aspects is riot limited to the specific details and representative embodiments shown and described herein. Accordingly, various modifications may be made without departing from the spirit or scope of the general inventive concept as defined by the appended claims and their equivalents.

What is claimed is:

1. An electronic calculator comprising:
   a mathematical formula input unit configured to input a mathematical formula according to a user manipulation;
   a calculation unit configured to calculate a calculation result of the mathematical formula;
   a display unit configured to display the mathematical formula and the calculation result;
   a position specifying unit configured to specify a position in a display area on the display unit according to a user manipulation;
   a right slide ENG display control unit configured to perform ENG normal conversion to the calculation result and update display contents thereof when a position of the calculation result is specified by the position specifying unit and a slide manipulation is performed toward the right; and
   a left slide ENG display control unit configured to perform ENG inverse conversion to the calculation result and update display contents thereof when a position of the calculation result is specified by the position specifying unit and a slide manipulation is performed toward the left.

2. The electronic calculator according to claim 1, further comprising an ENG symbol display setting unit configured to make a setting as to whether the calculation result is to be displayed using an ENG symbol according to a user manipulation, wherein
   the display unit displays the calculation result to which the ENG normal conversion or the ENG inverse conversion is performed, using the ENG symbol in an exponent portion, when the ENG symbol display setting unit makes a setting to display the calculation result using the ENG symbol.

3. The electronic calculator according to claim 1, wherein
   the display unit is capable of displaying the plurality of mathematical formulas and the plurality of calculation results while correlating the plurality of mathematical formulas and the plurality of calculation results with each other, and
   the position specifying unit is capable of specifying any calculation result in the plurality of calculation results displayed on the display unit.

4. The electronic calculator according to claim 1, further comprising:
   a top slide display control unit configured to convert the calculation result into a fraction and update display contents thereof on the display unit when a position of the calculation result is specified by the position specifying unit and a slide manipulation is performed from the bottom toward the top; and
   a bottom slide display control unit configured to convert the calculation result into a decimal fraction and update display contents on the display unit when a position of the calculation result is specified by the position specifying unit and a slide manipulation is performed from the top toward the bottom.

5. A method of displaying a calculation result of an electronic calculator comprising an input unit and a display unit, the method comprising:
   inputting a mathematical formula according to a user manipulation;
   calculating a calculation result of the mathematical formula;
   displaying the mathematical formula and the calculation result;
   specifying a position in a display area on the display unit according to a user manipulation;
   performing ENG normal conversion to the calculation result and updating display contents thereof when a position of the calculation result is specified and a slide manipulation is performed toward the right; and
   performing ENG inverse conversion to the calculation result and updating display contents thereof when a position of the calculation result is specified and a slide manipulation is performed toward the left.

6. A non-transitory computer-readable storage medium having program code stored thereon for controlling a computer equipped with an input unit and a display unit to display a calculation result, the program code comprising:

inputting a mathematical formula according to a user manipulation;
calculating a calculation result of the mathematical formula;
displaying the mathematical formula and the calculation result;
specifying a position in a display area on the display unit according to a user manipulation;
performing ENG normal conversion to the calculation result and updating display contents thereof when a position of the calculation result is specified and a slide manipulation is performed toward the right; and
performing ENG inverse conversion to the calculation result and updating display contents thereof when a position of the calculation result is specified and a slide manipulation is performed toward the left.

* * * * *